United States Patent [19]

Goodridge

[11] Patent Number: 5,519,256

[45] Date of Patent: May 21, 1996

[54] MOTOR VEHICLE LIGHTS, AUXILIARY BRAKE AND CRUISE CONTROLS

[76] Inventor: Eugene W. Goodridge, 10934 State Swy. 95, Princeton, Minn. 55371

[21] Appl. No.: 188,695

[22] Filed: Jan. 31, 1994

[51] Int. Cl.[6] .................................................... H01H 9/06
[52] U.S. Cl. .......................... 307/10.8; 307/9.1; 307/10.1; 307/114; 200/61.28; 200/61.88; 200/332.1; 200/332.2
[58] Field of Search ............................. 200/61.28, 61.88, 200/61.85, 332, 332.1, 332.2; 307/9.1, 10.1, 10.8, 113, 114, 326; 315/76, 77, 80, 82, 83

[56] References Cited

U.S. PATENT DOCUMENTS

| | | | |
|---|---|---|---|
| 1,931,775 | 10/1933 | Stafak | 200/61.28 |
| 3,629,606 | 12/1971 | Mathey | 307/114 |
| 3,941,009 | 3/1976 | Brown | 200/61.28 |
| 4,158,833 | 6/1979 | Chicoine | 200/61.88 |
| 4,162,384 | 7/1979 | Chicoine | 200/61.88 |
| 4,199,747 | 4/1980 | Miller et al. | 200/61.88 |
| 4,822,962 | 4/1989 | MacCourt | 200/61.88 |

Primary Examiner—William M. Shoop, Jr.
Assistant Examiner—Peter Ganjoo
Attorney, Agent, or Firm—Burd, Bartz & Gutenkauf

[57] ABSTRACT

A control for the headlights, clearance lights, auxiliary engine brake and cruise control of a tractor trailer motor vehicle has second control switches mounted on the gear shift lever adjacent the top knob thereon. The switches are operatively associated with conventional switched mounted on the dash board of the vehicle to allow the operator to use the conventional switches or the second control switches to selectively control the headlights, clearance lights, auxiliary engine brake or cruise control of the vehicle.

21 Claims, 2 Drawing Sheets

5,519,256

MOTOR VEHICLE LIGHTS, AUXILIARY BRAKE AND CRUISE CONTROLS

FIELD OF INVENTION

The invention relates to electrical switch control apparatus for motor vehicle headlights, clearance lights, auxiliary engine brake and cruise control systems. The switch control apparatus has a digital control device mounted on the gear shift lever of a tractor trailer motor vehicle which allows the operator of the vehicle to selectively control the headlights, clearance lights, auxiliary engine brake and cruise control systems associated with the tractor trailer vehicle.

BACKGROUND OF THE INVENTION

Tractor trailer motor vehicles known as semi trucks are equipped with headlights, clearance lights, auxiliary engine brake and cruise control systems for controlling the operation and braking of the vehicle and providing light for the operator and other vehicles on the road. The controls for the lights, auxiliary engine brake and cruise control are normally operated electrical switches mounted on the vehicle's dash board adjacent one side of and forwardly of the steering wheel. Over the road, tractor trailer operators use headlights and clearance lights to inform a passing vehicle to proceed to pass and switch road lanes after the pass has been completed. The headlights of the vehicle are turned ON and OFF to signal a safe pass. The clearance lights of the vehicle are turned ON and OFF to signal that the passing vehicle has sufficient clearance to switch road lanes. The operator must use the headlight and clearance light switches located on the dash board to control the headlights and clearance lights. The auxiliary engine brake and cruise control switches are also periodically operated to control the auxiliary engine brake and cruise control systems of the tractor trailer. The auxiliary engine brake, known as a jake brake, and a C brake, is an engine retarder that, when activated, partially closes the engine exhaust valves. This creates a back pressure in each of the cylinders of the engine which slows the engine RPM and ground speed thereby braking the vehicle. The cruise control is disengaged each time the operator uses the clutch or foot brake. The cruise control must be activated by operation of the cruise control switch after each gear change and foot brake operation. The operator must remove one hand from the steering wheel and reach forward to operate these switches. The operator must visually locate the selected switch to be actuated thereby momentarily taking attention and eyes off of the road. This repetitive procedure increases operator stress, fatigue and exhaustion.

Motor vehicle turn signal and stop light switches have been incorporated in the knobs mounted on the outer ends of the gear shift levers. J. Stack in U.S. Pat. No. 1,931,775 discloses a plurality of lights at the front and rear of an automobile with direction indicators designed to be separately illuminated to indicate to pedestrians and motorists the movements forward, right or left, or the intention to stop by the driver of the automobile. The electric switches for controlling the lights are located on the enlarged head mounted on the gear shift lever. G. J. Chicoine in U.S. Pat. No. 4,158,883 uses a manually-operated, normally open switch mounted on the gear shift knob of an automobile to activate the rear brake lights during down-shifting to decelerate the automobile. These switch controls do not include the normal light switches of the automobile and are not associated with the automobile's cruise control or a tractor trailer auxiliary engine braking systems.

SUMMARY OF THE INVENTION

The invention pertains to an apparatus for controlling the headlights, clearance lights, auxiliary engine brake and cruise control of a motor vehicle and particularly a semi tractor trailer vehicle equipped with headlights, clearance lights, an auxiliary engine brake system and a cruise control system used to operate the vehicle. The vehicle has a conventional power source such as a battery that provides the electrical power for the vehicle. A gear shift lever mounted on the vehicle floor manually-operated by the operator of the vehicle is located adjacent one side of the steering wheel. The vehicle has a conventional headlight switch, clearance light switch, auxiliary engine brake control switch and cruise control switch mounted on the dash board which, when used by the operator of the vehicle, requires forward movement of the hand of the operator to locate the selected switch to be actuated and thereby momentarily taking attention and eyes off of the road. The repetitive use of these switches results in operator stress, fatigue and exhaustion. An operator control device is used to mitigate the disadvantages of the dash board switches. The control device has a second headlight switch, a second clearance light switch, a second auxiliary engine brake switch and a second cruise control switch mounted on a casing which is attached to the gear shift lever. The casing is connected with a bracket or suitable fasteners to the upper portion of the gear shift lever immediately below the conventional knob used by the operator to manipulate the gear shift lever in the driving of the vehicle. The casing projects laterally from gear shift lever toward the vehicle operator so that the thumb of the right hand can be used to activate the selected switches. Electrical conductors operatively connect the second headlight switch, second clearance light switch, second auxiliary engine brake switch and second cruise control switch to the corresponding first switches on the dash board and ground, as well as the headlights, clearance lights, auxiliary engine brake and cruise controls. The second switches are operable to control the headlights, clearance lights, auxiliary engine brake and cruise control systems of the vehicle. The second switches have manually-operated actuators that allows the operator of the vehicle to selectively operate the switches without removing the hand from the gear shift lever. The knob on the gear shift lever is a locator for the hand relative to the switch actuators. The operator can maintain complete attention to the roadway while at the same time operate the second switches to control the functions of the headlights, clearance lights, auxiliary engine brake and cruise control systems of the vehicle.

In one form of the invention, the control device has a second headlight switch, a second clearance light switch, a second auxiliary engine brake switch and a second cruise control switch. Each of these switches except the second cruise control switch are connected in series with the corresponding switches located on the dash board of the vehicle and ground. The second cruise control switch is connected in parallel with the first cruise control switch so that the second cruise control switch is operable to activate the cruise control independently of the operation of the first cruise control switch. Both the first and second switches for each function except the cruise control of the vehicle must be in the ON condition to provide electrical power to the headlights, clearance lights, and auxiliary engine brake. In a second form of the invention, the second switches of the control device are connected in parallel with the first switches so that the headlights, clearance lights, auxiliary engine brake and cruise control systems of the vehicle can be selectively operated with either the first or second switches for the respective functions.

Additional objects, and the features and advantages of the control device of the invention are incorporated in the following detailed description of preferred embodiments with the accompanying drawings.

DESCRIPTION OF PREFERRED EMBODIMENTS

Figure 1:
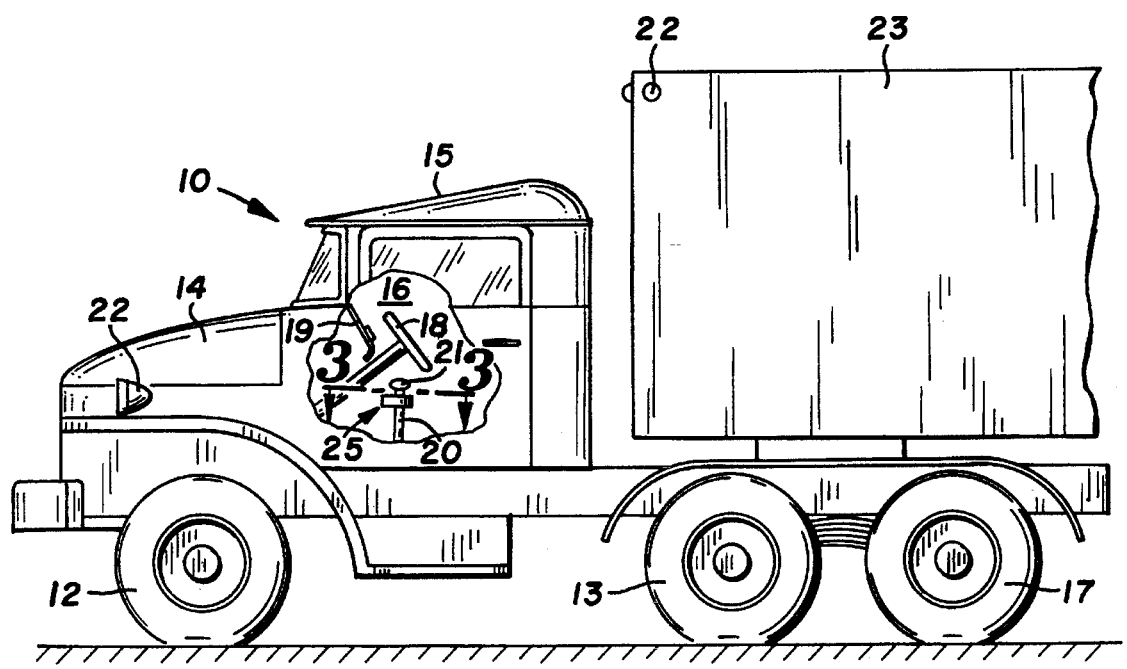
FIG. 1 is a fragmentary side elevational view of a motor vehicle shown as a tractor trailer vehicle equipped with the headlight, clearance light, auxiliary engine brake and cruise control device of the invention.

Referring to FIG. 1, there is shown a motor vehicle indicated generally at 10, known as a tractor trailer motor vehicle having a tractor 14 coupled to a trailer 23. Tractor 14 has front wheels 12 and rear drive wheels 13 and 17 mounted on a frame supporting a cab 15. Cab 15 has conventional driver passenger compartment 16 accommodating a steering wheel 18 located generally below a dash board 19 supporting the instruments of the vehicle 10. An upwardly directed gear shift lever 20 is located in the driver compartment and has a top hand knob 21 to facilitate the hand of the operator of the vehicle. The vehicle 10 has conventional headlights 22, clearance lights 24, auxiliary engine brake 30 and cruise control 31 systems that facilitates the operation of the vehicle.

Headlights 22 are connected to the conventional ON/OFF switch and dimmer controls used to connect the electric power source to the headlights. These controls for headlights 22 are not part of the present invention. Auxiliary engine brake 30, known as a jake brake or C brake, is a vehicle braking system that utilizes the engine vehicle drive train and drive wheels to achieve a vehicle braking function. Brake 30 includes an electrically-operated valve for controlling the flow and pressure of hydraulic fluid or oil used to operate the exhaust valves of the engine. Switch 34 functions to operate the electrically-operated valve. When brake 30 is activated, the engine exhaust valves only partially open during the exhaust stroke of the engine. This creates a back pressure of the gases in the cylinders of the engine which reduces engine RPM thereby retarding the ground speed of the vehicle. The conventional air brakes of the tractor trailer may also be used to achieve braking with brake 30.

Cruise control 31 functions to automatically control diesel engine operation to achieve maximum performance. The cruise control switch 35 has six functions which are: OFF and ON, SET, RESUME, AUTOMATIC IDLE SPEED, INCREASE SPEED and REDUCE SPEED. Cruise control 31 is activated by the OFF and ON function. Switch 35 is a three position manually-activated electric switch having an OFF control position, and up ON or SET position and a down ON or RESUME position. Other types of three position switches can be used to achieve the cruise control functions.

A digital control device, indicated generally at 25, is mounted on gear shift lever 20 adjacent the knob 21 to allow the operator digital access to the controls for headlights 22, clearance lights 24, auxiliary engine brake 30 and cruise control 31 systems. Control device 25 is secured to gear shift lever 20 directly below knob 21 and projects laterally toward steering wheel 18 of the vehicle operator. The thumb of the right hand of the operator can be used to activate switches 46–49 incorporated in control device 25. Knob 21 is used as a hand locator for switch actuators 42–45 of control device 25. Digital control device 25 allows the operator of the vehicle to selectively control headlights 22, clearance lights 24, auxiliary engine brake 30 and cruise control 31 systems without reaching for the conventional switches 32–35 on the dash board 19 and momentarily taking attention and eyes off of the roadway.

Figure 2:
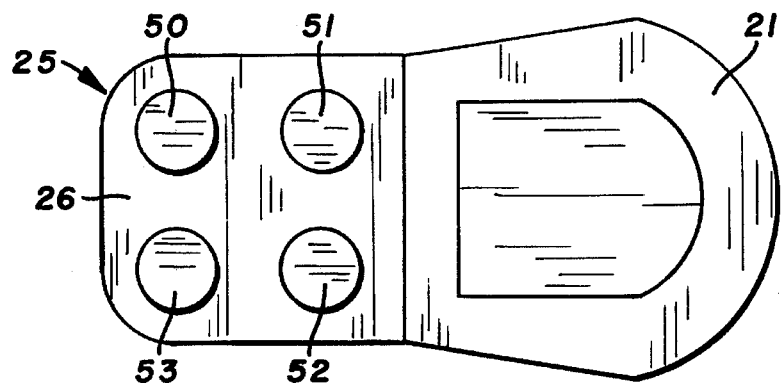
FIG. 2 is a top plan view of the gear shift lever knob and control device of the motor vehicle of FIG. 1.
Figure 3:
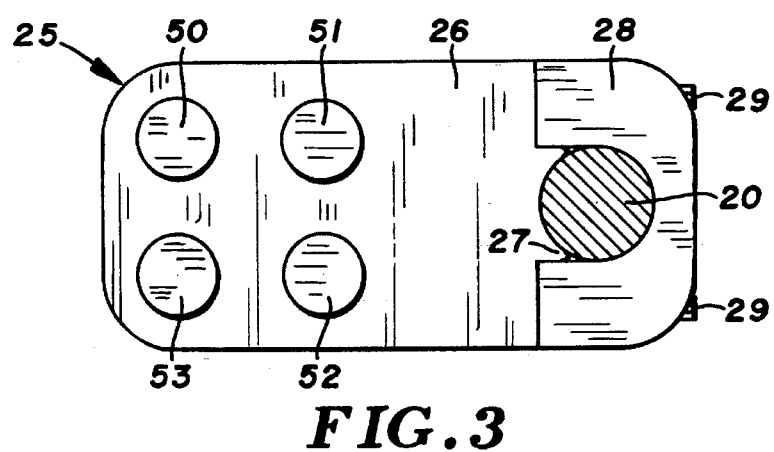
FIG. 3 is an enlarged sectional view taken along the line 3—3 showing a top plan view of the digital operated control device of the headlight, clearance light, auxiliary engine brake and cruise control system mounted on the upper end of the gear shift lever.

As seen in FIGS. 2 and 3, control device 25 has a generally rectangular casing 26 located laterally of gear shift lever 20. Casing 26 projects to the left of lever 20 toward the vehicle operator. Casing 26 has a rearwardly directed central boss 27 having a concave groove to accommodate the circular portion of gear shift lever 20. A U-shaped bracket 28 having a U-shaped pocket accommodates an opposite portion of gear shift lever 20 and is attached to casing 26 with a pair of fasteners 29, shown as bolts. Other types of connectors and fasteners can be used to secure casing 26 to gear shift lever 20. Fasteners 29 clamp bracket 28 and casing 26 in a tight fixed relation on gear shift lever 20. Fasteners 29 can be released to allow casing 26 and bracket 28 to be circumferentially positioned laterally of gear shift lever 20 to accommodate the driver of the vehicle.

Figure 4:
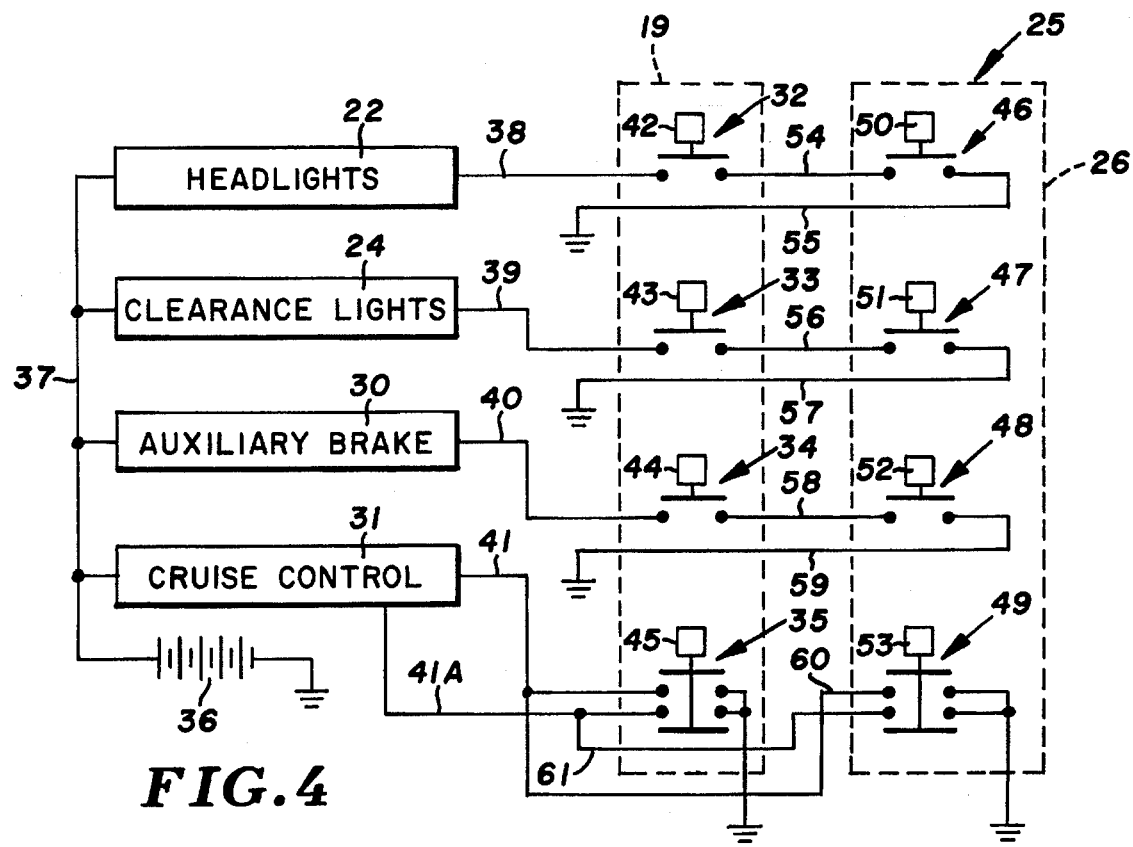
FIG. 4 is a diagrammatic view of the switch control circuit for the headlights, clearance lights, auxiliary engine brake and cruise control system of the motor vehicle of FIG. 1.

As seen in FIG. 4, dash 19 accommodates headlight switch 32, a clearance light switch 33, an auxiliary engine brake switch 34 and a cruise control switch 35. Headlights 22, clearance lights 24, auxiliary engine brake 30 and cruise control 31 are connected to a battery or power source 36 with a conductor line 37. Headlights 22 are connected with line 38 to headlight switch 32. A conductor line 39 connects clearance light switch 33 to clearance lights 24. A conductor line 40 connects auxiliary engine brake switch 34 to auxiliary engine brake 30. Conductor lines 41 and 41A connect cruise control switch 35 to cruise control 31. Switches 32–34 have buttons or actuators 42, 43, 44 and 45 respectively, that are manually-operated to close switches 32–35 or alternatively open the switches. Switches 32–34 are single pole electrical switches that are manually-actuated and will remain in the closed position. A subsequent operation of actuators 42–44 will open switches 32–34 which will remain open until they are actuated again.

Casing 26 of digital control device 25 has a second headlight switch 46, a second clearance light switch 47, a second auxiliary engine brake switch 48 and a second cruise control switch 49. Switches 46–49 have manually-operated upright actuators or buttons 50, 51, 52 and 53, respectively, located laterally and below knob 21 on gear shift lever 20 so that they can be activated with the thumb of the right hand of the operator of the vehicle 10. Knob 21 provides a locator for the hand of the operator so that switches 46–49 can be operated without reaching or visual observation by the vehicle operator. Buttons 50–53 are movably mounted on casing 26 in a rectangular or cartesian pattern. Switches 46–48 are single pole electrical switches that are manually-actuated and will selectively remain open or closed. When switches 46–48 are closed, they will remain closed until a subsequent operation of actuators 50–53 will open the switches. Switches 46–49 will remain open until they are actuated again. Switch 49 is a three position manually-operated electric switch having an OFF central position, an ON or SET position, and a down ON or RESUME position. Other types of three position switches can be used to achieve the cruise control functions.

Switch 46 is connected in series with switch 32 with lines 54 and 55 so that both switches must be in the ON positions to operate the headlights 22. When switches 32 and 46 are both ON, the headlights will be in operation. Releasing either switch 32 or 46 will turn headlights OFF to signal another vehicle that passing vehicle 10 can begin.

Clearance light switches 33 and 47 are connected in series with lines 56 and 57 so that both switches 33 and 47 must be in the ON positions to operate the clearance lights 24. Clearance lights 24 can be turned OFF and ON by operation of either switch 33 or 47 to signal that the passing maneuver has been completed. Auxiliary engine brake switches 34 and 48 are connected in series with lines 58 and 59 so that both switches 34 and 48 must also be in the ON positions to operate the auxiliary engine brake 30. The cruise control switches 35 and 49 are connected in parallel with lines 60 and 61 so that the cruise control system can be operated with both switches 35 and 49. When one of the switches 35 or 53 is open of OFF, the cruise control 31 can be operated with the other switch. In use, switch 35 is bypassed with the use of switch 49 to control the cruise control 31 of the vehicle.

In use, the operator of vehicle 10 can control headlights 22 with either dashboard switch 32 or digital control headlight switch 46. Both switches 32 and 46 must be used to operate the headlights 22. In nocturnal, dark or foggy driving conditions, headlights 22 are turned OFF and ON by the operator of vehicle 10 to signal drivers of a passing vehicle that the roadway is clear for a safe pass of vehicle 10. This can be achieved by operation of switch 46 located adjacent knob 21 with the right hand of the operator.

Clearance lights 24 can be operated with the dash switch 33 or digital control switch 47. Both switches 43 and 47 must be closed to operate the clearance lights since these switches are connected in series with clearance lights 24 and the ground. When switch 33 is closed, switch 51 can operate the clearance lights. When switch 51 is closed, switch 33 can operate clearance lights 34. In nocturnal, dark and foggy driving conditions, clearance lights 24 are ON. Clearance lights 24 are turned OFF and ON by the operator of the vehicle to signal the drivers of other vehicles that they have cleared vehicle 10.

Auxiliary engine brake 30 is operated by switches 34 and 48 which are connected in series. The auxiliary engine brake is a conventional part of the vehicle's braking system. Switches 34 and 48 must be concurrently closed to operate the brake 30 system. When switch 34 is closed, switch 48, at digital control device 25, can operate brake 30. When switch 48 is closed, switch 34 on dash board 19 can be used to operate the brake 30.

Cruise control 31 is operated with the use of one of the switches 35 and 49. These switches are three position manually-operated electrical switches that have a first OFF position and a second SET and then RESUME ON positions. The cruise control switches function to automatically control the operation of the cruise control associated with a diesel engine. Switches 35 and 49 can be moved between SET and RESUME positions to couple cruise control 31 to ground. When either switch 35 or 49 is in SET position, the cruise control 31 will automatically bring the engine to idle speed at 1000 RPM when the vehicle is in neutral and the air brake is set. The idle speed can be increased by moving a switch to the RESUME position and decreased by moving the switch to the SET position. Movement of a switch 35 or 49 to SET when vehicle 10 is moving faster than 30 miler per hour will cause cruise control 31 to maintain the selected speed. When the activated switch is moved to it's OFF position, the cruise control is deactivated. Vehicle speed can be increased by momentarily moving a switch 35 or 49 to RESUME or decreased by momentarily moving switch 35 or 49 to SET. Using the clutch or foot brake will disengage the cruise control function of the engine.

Figure 5:
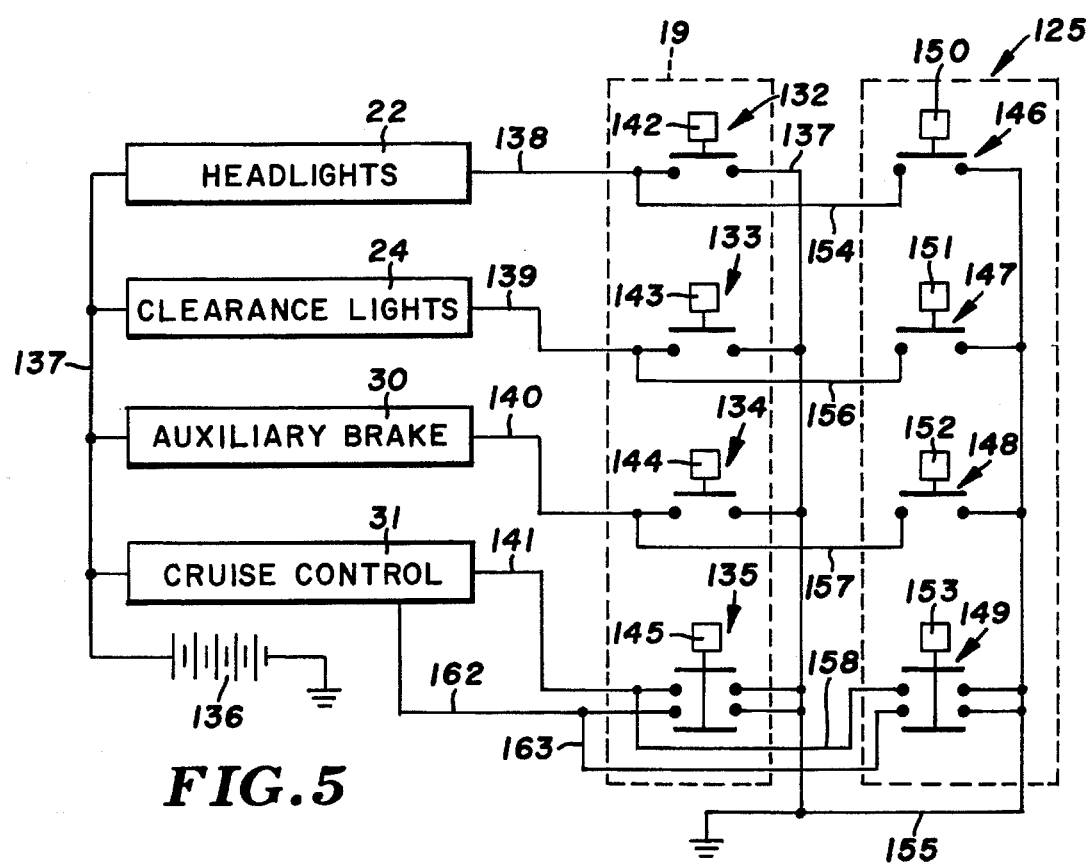
FIG. 5 is a diagrammatic view of a modification of the electrical circuit for the headlights, clearance lights, auxiliary engine brake and cruise control system of the motor vehicle.

Referring to FIG. 5, there is shown a modification of the digital control device indicated generally at 125. Dash board 19 has a headlight switch 132, a clearance light switch 133, an auxiliary engine brake switch 134 and a cruise control switch 135 connected to ground. The power source of the vehicle shown as battery 136 is connected with a cable or line 137 to headlights 22, clearance lights 24, auxiliary engine brake 30 and engine cruise control 31. Switch 132 is connected with line 138 to headlights 22. Lines 138, 139, 140 and 141 connect headlights 22, clearance lights 24, auxiliary engine brake 30 and cruise control 31 to switches 132–135, respectively. A second line 162 also connects switch 135 to cruise control 31. Switches 132–135 have buttons or actuators 142, 143, 144 and 145 that are accessible to the operator of the vehicle. Switches 132–134 are single pole electrical switches that remain ON or OFF until they are actuated. Switch 135 is a three position manually-operated electric switch having a first OFF position, a second SET position and a third RESUME position for controlling the functions of cruise control 31. Buttons 142–144 must be depressed to change the ON and OFF conditions of the switches. Button 145 is used to change the positions of switch 135. The actuators 142–145 are mounted on dash board 19, and when actuated to the ON position, connect headlights 22, clearance lights 24, auxiliary engine brake 30 and cruise control 31, to ground. The power source or battery 136, is connected with a line or cable 137 to headlights 22, clearance lights 24, auxiliary engine brake 30 and cruise control 31.

Digital control device 125 has four digitally-operated switches comprising headlight switch 146, clearance light switch 147, auxiliary engine brake switch 148 and cruise control switch 149. These switches have manually-operated actuators or buttons 150, 151, 152 and 153, respectively. Switches 146–148 are single pole electrical switches that remain ON or OFF until they are activated. Actuators or buttons 150–152 must be depressed to change the ON and OFF conditions of the switches. Switch 149 is a three position manually-operated electrical switch having a first OFF position, a second SET position and a third RESUME position for controlling the functions of cruise control 31. Switch 146 is connected in parallel with switch 132 with a line 154 and a line 155 leading to ground. A line 156 connects clearance light switch 147 to line 138 whereby switch 147 is in parallel with switch 133, so that each switch 133 and 147 can independently operate clearance lights 124. Auxiliary engine brake switch 148 is located in parallel with switch 134 and is connected with a line 157 to line 140. Switches 134 and 148 can be independently operated to control auxiliary engine brake 130, as these switches are in parallel with each other. Cruise control switches 135 and 139 are connected in parallel with a line 158 connecting switch 149 to line 141 and a line 163 connected to line 162. All of switches 146, 147, 148 and 149 are connected to line 155 leading to ground. Each switch 146–149 can be independently connected to ground.

In use, the operator of the vehicle can independently operate the headlights from dash board 19 or digital control device 125, as switches 132 and 146 can be independently operated to turn headlights 22 ON and OFF. Clearance lights 24 can be independently operated from dash switch 133 or digital control switch 147. When either of switches 133 and 147 are closed, clearance lights 24 are turned ON. Clearance lights 24 can be turned OFF by opening either switch 133 or 147. Auxiliary engine brake 30 can be selectively and independently operated with brake switches 134 on dash 19 or 148 on digital control device 125. The cruise control is also connected in parallel to switches 135 and 149 so that switches 135 and 149 can be independently operated to control cruise control 31.

The size, shape, construction and details of the switches and arrangement of the switches of the digital control device may be changed by those skilled in the art without departing from the invention. The invention is defined in the following claims.

I claim:

1. In combination: A motor truck having headlights, clearance lights, an auxiliary engine brake, and a cruise control, an electrical power source for said lights, auxiliary engine brake and cruise control, a gear shift lever having an upper end, knob mounted on the upper end of the lever, a dash board and a first headlight switch, a first clearance light switch, a first auxiliary engine brake switch and a first cruise control switch mounted on the dash board, said switches connected to said headlights, clearance lights, auxiliary engine brake and cruise control being operable to connect and disconnect electric power thereto, a control device having a second headlight switch, a second clearance light switch, a second auxiliary engine brake switch and a second cruise control switch, electrical conductor means operatively connecting said second headlight switch, second clearance light switch, second auxiliary engine brake switch and second cruise control switch to said headlights, clearance lights, auxiliary engine brake and cruise control whereby said second switches are operable to control the headlights, clearance lights, auxiliary engine brake and cruise control, and means connecting the control device to said gear shift lever adjacent the knob whereby the second headlight switch, second clearance light switch, second auxiliary engine brake switch and second cruise control switch are accessible to one hand of the operator of the motor truck located on the knob at the upper end of the gear shift.

2. The apparatus of claim 1 wherein: said control device includes a casing mounted on the gear shift lever, said means connecting the control device comprising a bracket engageable with the gear shift lever and fastener means connecting the bracket to the casing to secure the casing and bracket to said gear shift lever.

3. The apparatus of claim 2 wherein: said casing has a boss having a concave groove accommodating a first portion of the gear shift lever, said bracket having a U-shaped pocket accommodating a second portion of the gear shift lever, said fastener being operable to clamp the casing and bracket in a tight fixed relation on said first and second portions of the gear shift lever.

4. The apparatus of claim 1 wherein: said control device includes a casing and manually-operable buttons mounted on the casing connected to said second headlight switch, second clearance light switch, second auxiliary engine brake switch and second cruise control switch.

5. The apparatus of claim 4 wherein: said buttons are located in a cartesian arrangement.

6. The apparatus of claim 1 wherein: the gear shift lever has a knob on the upper end thereof, said control device includes a casing mounted on said lever adjacent said knob and projected laterally thereof, said first switches having actuators projected upwardly from said casing are accessible to the hand of the operator of the motor vehicle.

7. In combination: a motor vehicle having headlights, clearance lights, an auxiliary engine brake, and a cruise control, an electric power source for said lights, auxiliary engine brake and cruise control, a gear shift lever, a dash board, a first headlight switch, a first clearance light switch, a first auxiliary engine brake switch, and a first cruise control switch mounted on the dash board, said switches being connected to ground and said headlights, clearance lights, auxiliary engine brake and cruise control and operable to connect and disconnect electric power thereto, a control device having a second headlight switch, a second clearance light switch, a second auxiliary engine brake switch and a second cruise control switch, first electrical conductor means connecting the first and second headlights in parallel with the power source, ground and headlights, whereby either the first and second headlight switches, when ON, control the headlights, second electrical conductor means connecting the first and second clearance lights switches in series with the power source and clearance lights whereby both first and second clearance light switches must be ON to provide electrical power to said clearance lights, third electrical conductor means connecting the first and second auxiliary engine brake switches in series with the power source and auxiliary engine brake whereby both first and second auxiliary engine brake switches, when ON, control the auxiliary engine brake, fourth electrical conductor means connecting the first and second cruise control switches in series with the power source and cruise control whereby both first and second cruise control switches, when ON, operate the cruise control, and means connecting the control device to said gear shift lever whereby the second headlight switch, second clearance light switch, second auxiliary engine brake and second cruise control switch are accessible to one hand of the operator of the motor vehicle.

8. The apparatus of claim 7 wherein: said control device includes a casing mounted on the gear shift lever and projected laterally therefrom, said means connecting the control device comprising a bracket engageable with the gear shift lever and fastener means connecting the bracket to the casing to secure the casing and bracket to said gear shift lever.

9. The apparatus of claim 8 wherein: said casing has a boss having a concave groove accommodating a first portion of the gear shift lever, said bracket having a U-shaped pocket accommodating a second portion of the gear shift lever, said fastener means clamps the casing and bracket in a tight fixed relation on said first and second portions of the gear shift lever.

10. The apparatus of claim 7 wherein: said control device includes a casing and manually-operable buttons mounted on the casing connected to said second headlight switch, second clearance light switch, second auxiliary engine brake switch and second cruise control switch.

11. The apparatus of claim 10 wherein: said buttons are located in a cartesian arrangement.

12. The apparatus of claim 7 wherein: the gear shift lever has a knob on the upper end thereof, said control device includes a casing mounted on said lever adjacent said knob, said first switches having actuators projected upwardly from said casing are accessible to the hand of the operator of the motor vehicle.

13. In combination: A motor vehicle having headlights, clearance lights, an auxiliary engine brake, and a cruise control, an electrical power source for said lights, auxiliary engine brake and cruise control, a gear shift lever, a dash board and a first headlight switch, a first clearance light switch, a first auxiliary engine brake switch and a first cruise control switch mounted on the dash board, said switches being connected to ground and said headlights, clearance lights, auxiliary engine brake and cruise control systems being operable to connect and disconnect electric power thereto, a control device having a second headlight switch, a second clearance light switch, a second auxiliary engine brake switch and a second cruise control switch, first electrical conductor means connecting the first and second headlight switches in parallel with ground and headlights whereby either the first and second headlight switches control the headlights, second electrical conductor means connecting the first and second clearance light switches in parallel with ground and clearance lights whereby either the first and second clearance light switches are operable to operate said clearance lights, third electrical conductor means connecting the first and second auxiliary brake switches in parallel with the power source and auxiliary engine brake whereby either the first and second auxiliary engine brake switches are operable to control the auxiliary engine brake, fourth electrical conductor means connecting the first and second cruise control switches in parallel with ground and cruise control whereby either the first and second cruise control switches are operable to operate the cruise control, and means connecting the control device to said gear shift lever whereby the send headlight switch, second clearance light switch, second auxiliary engine brake switch and second cruise control switch are accessible to one hand of the operator of the motor vehicle.

14. The apparatus of claim 13 wherein: said control device includes a casing mounted on the gear shift lever, said means connecting the control device comprising a bracket engageable with the gear shift lever and fastener means connecting the bracket to the casing to secure the casing and bracket to said gear shift lever.

15. The apparatus of claim 14 wherein: said casing has a boss having a concave groove accommodating a first portion of the gear shift lever, said bracket having a U-shaped pocket accommodating a second portion of the gear shift lever, said fastener means clamps the casing and bracket in a tight fixed relation on said first and second portions of the gear shift lever.

16. The apparatus of claim 13 wherein: said control device includes a casing and manually-operable buttons mounted on the casing connected to said second headlight switch, second clearance light switch, second auxiliary engine brakes switch and second cruise control switch.

17. In combination: A motor vehicle having headlights, clearance lights, an auxiliary engine brake, and a cruise control, an electrical power source for said lights, auxiliary engine brakes and cruise control, a gear shift lever, a dash board and a first headlight switch, a first clearance light switch, a first auxiliary engine brake switch and a first cruise control switch mounted on the dash board, said switches being connected to said headlights, clearance lights, auxiliary engine brake and cruise control systems being operable to connect and disconnect electric power thereto, a control device for at least one of said headlights, clearance lights, auxiliary engine brake or cruise control of the vehicle, means mounting said control device on said gear shift lever whereby the control device is accessible to the hand of the operator used to operate the gear shift lever, said control device having at least one switch means connected to ground and operatively connected to one of said headlights, clearance lights, auxiliary engine brake or cruise control for operation thereof.

18. The apparatus of claim 17 wherein: said control device includes a casing mounted on the gear shift lever, said means connecting the control device comprising a bracket engageable with the gear shift lever and fastener means connecting the bracket to the casing to secure the casing and bracket to said gear shift lever.

19. The apparatus of claim 17 wherein: the gear shift lever has a knob on the upper end thereof, said control device includes a casing mounted on said lever adjacent said knob and projected laterally thereof, said switch means having actuators projected upwardly from said casing are accessible to the hand of the operator of the motor vehicle.

20. The apparatus of claim 17 wherein: said control device is operable to control the headlights and clearance lights of the vehicle, said switch means including a headlight switch connected to the headlights and ground, and a clearance light switch connected to the clearance lights and ground for operation thereof.

21. The apparatus of claim 17 wherein: said control device is operable to control the auxiliary engine brake and cruise control of the vehicle, said switch means including an auxiliary engine brake switch connected to the auxiliary engine brake and ground and cruise control switch connected to the cruise control and ground for operation thereof.

\* \* \* \* \*